(12) United States Patent
Kraft

(10) Patent No.: US 7,995,734 B2
(45) Date of Patent: Aug. 9, 2011

(54) TELEPHONE GROUP IDENTIFICATION RING

(76) Inventor: Clifford Kraft, Naperville, IL (US)

( * ) Notice: Subject to any disclaimer, the term of this patent is extended or adjusted under 35 U.S.C. 154(b) by 1528 days.

(21) Appl. No.: 11/396,337

(22) Filed: Apr. 1, 2006

(65) Prior Publication Data

US 2007/0263807 A1    Nov. 15, 2007

(51) Int. Cl.
*H04M 3/42* (2006.01)
*H04M 1/56* (2006.01)
*H04M 15/06* (2006.01)

(52) U.S. Cl. ......... 379/207.16; 379/142.06; 379/142.08; 379/207.15

(58) Field of Classification Search ............ 379/207.16, 379/211.01, 127.03, 207.15, 142.08, 142.06; 455/414.1, 566, 567
See application file for complete search history.

(56) References Cited

U.S. PATENT DOCUMENTS

| 5,666,405 | A  | * | 9/1997  | Weber ................... 379/127.03 |
| 5,995,603 | A  |   | 11/1999 | Anderson ................. 379/142 |
| 6,606,508 | B2 | * | 8/2003  | Becker et al. ............ 455/567 |
| 6,711,239 | B1 |   | 3/2004  | Borland ................... 379/67.1 |
| 2004/0198455 | A1 | * | 10/2004 | Deeds ................... 455/566 |
| 2004/0203631 | A1 | * | 10/2004 | Wong et al. ............ 455/414.1 |
| 2005/0008135 | A1 | * | 1/2005  | Bressler ............... 379/211.01 |

\* cited by examiner

*Primary Examiner* — Thjuan K Addy
(74) *Attorney, Agent, or Firm* — Clifford Kraft

(57) ABSTRACT

A telephone caller identification system where potential callers can be assigned to call-in groups, each call-in group having a particular ring. When a member of a particular call-in group calls, the telephone presents the ring associated with that call-in group. A caller not assigned to any call-in group causes the telephone to present a default ring. The telephone can also present particular transfer rings when transferred indicating that the call being transferred is from a caller belonging to a particular call-in group, or provide unique voice mail rings when a member of a call-in group leaves voice mail.

8 Claims, 2 Drawing Sheets

TELEPHONE GROUP IDENTIFICATION RING

BACKGROUND

1. Field of the Invention

The present invention relates generally to the field of telephones, especially cellular telephones, and more particularly to a telephone ring system that identifies a caller as belonging to a group of possible callers.

2. Description of the Prior Art

It is known in the art to use different telephone rings to identify different types of incoming traffic or calls. Special rings have been used to identify the difference between an incoming long distance call and a local call or the difference between an internal PBX call and a call coming in from an outside line. Cellular telephones have used different rings to identify incoming calls, messages, pages, missed calls, voice mail and the like.

Borland in U.S. Pat. No. 6,711,239 teaches methods for identifying the callee of an incoming call. A distinctive ring can be selected for different people who might wish to receive calls. U.S. Pat. No. 6,711,239 is hereby incorporated by reference.

It is also known in the art for telephones to announce a caller ID using recorded voice or voice syntheses. There is no teaching in the prior art to use a unique ring to announce who is calling.

It would be advantageous, especially on a cellular telephone, to be able to assign a unique ring to an incoming call or a transferred call that comes from a particular caller or a particular group of callers such as family members. Different rings could identify different groups. Identification could be based on incoming caller ID and an internal address book.

SUMMARY OF THE INVENTION

The present invention relates to a telephone ring caller identification system that includes a telephone where the telephone contains a ring device capable of presenting a plurality of different rings, an address database that includes at least one name and number of a particular possible caller, a group database that contains at least one call-in group where the call-in group contains a name and number of a particular possible caller, the call-in group also is generally assigned a particular one of said plurality of rings so that when a caller belonging to a call-in group calls, said telephone presents the particular ring assigned to that call-in group. Unique rings can also be assigned to call-in groups for transfer and voice mail calls from members of the call-in group.

Illustrations have been provided to aid in the understanding of the invention. The scope of the present invention is not limited to what is shown in the figures.

DESCRIPTION OF THE INVENTION

The present invention relates to a telephone, especially a cellular telephone presenting a different ring tone for incoming calls or transferred calls from callers belonging to specially chosen groups. It is known in the art to allow telephones to have numerous different rings. Cellular telephones are supplied equipped with sets of possible rings that can be assigned by the user. In addition, users can download many more rings for internet sites and from phone service providers.

Incoming caller ID is presented with all types of incoming telephone calls. Also, many telephones, including almost all cellular telephones contain address books. Almost all telephones also contain the ability to present different rings. Prior art methods present different rings for different types of traffic such as calls, messages, pages, etc.

The present invention allows the user to define caller groups, such as a group of friends, members of a club, family, a spouse and/or child, etc. A particular caller would be required to belong to only one group since each group would have a pre-defined ring that would present whenever any member of the group called. A particular caller could be placed in more than one group if the groups are priority ordered. In this case, if a person belonging to more than one group called, the ring for the highest priority active group would be presented. Groups could be activated or deactivated by the user.

Figure 1:
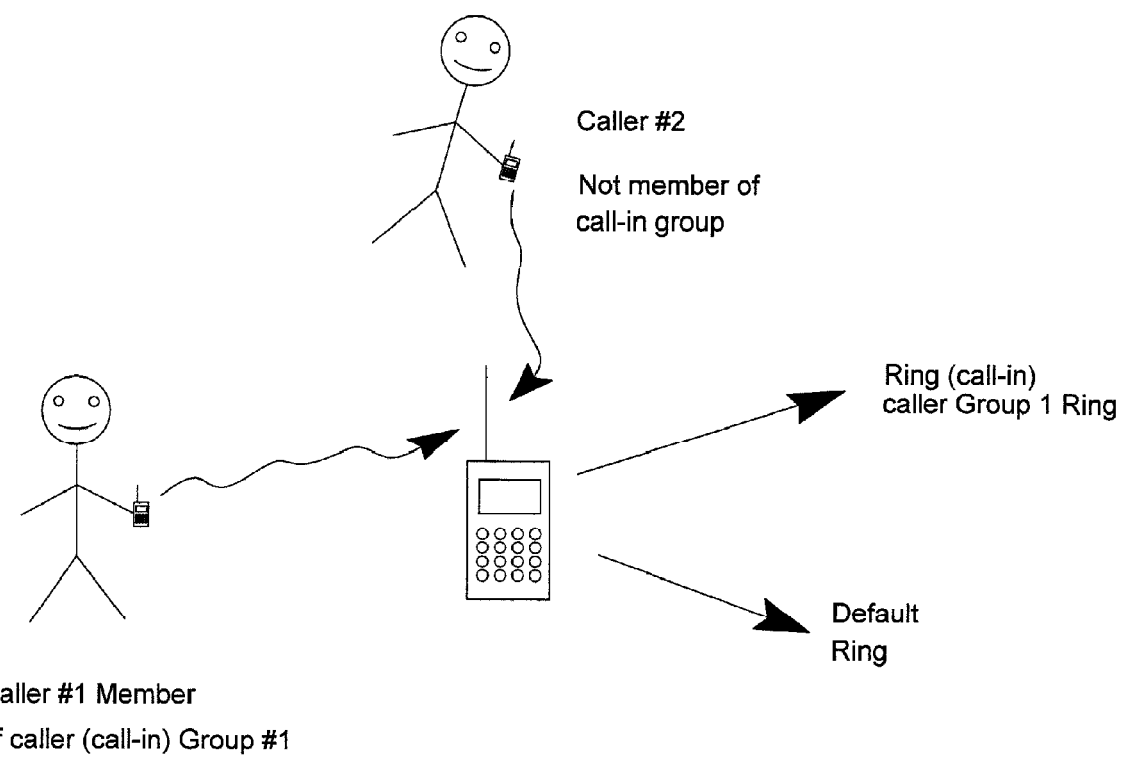
FIG. 1 shows an embodiment of the present invention where potential callers can be assigned to call-in groups, and particular rings can also be assigned to each call-in group.

FIG. 1 shows a diagram of an embodiment of the present invention. A ring database stores a plurality of different ring tones. A caller database stores callers in call-in groups. In the embodiment of FIG. 1, a particular caller can only belong to one call-in group. When a call comes in, the processor searches the call-in groups for a match on the incoming caller ID. If there is a match, the particular ring assigned to the particular call-in group the caller belongs to is presented. If there is no match, a standard default ring is presented instead.

Using the present invention, a user, particularly a user of a cellular telephone, can identify an incoming call as originating from a member of a group important to that person (such as family). In addition, when the phone is transferred, a unique transfer ring can be associated with a call-in group so the phone presents the unique transfer ring when a member of the call-in group calls. The same principle can be used for voice mail. The telephone can present a unique voice mail received ring when a member of a call-in group leaves voice mail.

The present invention allows a menu and input from keys or a keypad to create new call-in groups and assign particular rings to the groups. Potential callers in the address book can be assigned to a call-in group. This could be done, for example, by having one more field in a typical address book. It is well known in the art how to create address books and other databases in telephones, especially cellular telephones.

Thus, with the present invention, the user can, in addition to, or instead of, possible seeing a caller's name on a display, hear a distinctive ring assigned to that caller's call-in group. This way, without looking at the display, the user can know whether a call might be important or not simply by hearing the ring. It may be quite common with the present invention to have call-in groups having only one member (spouse for example). Other groups might contain multiple members (user's children), etc.

Figure 2:
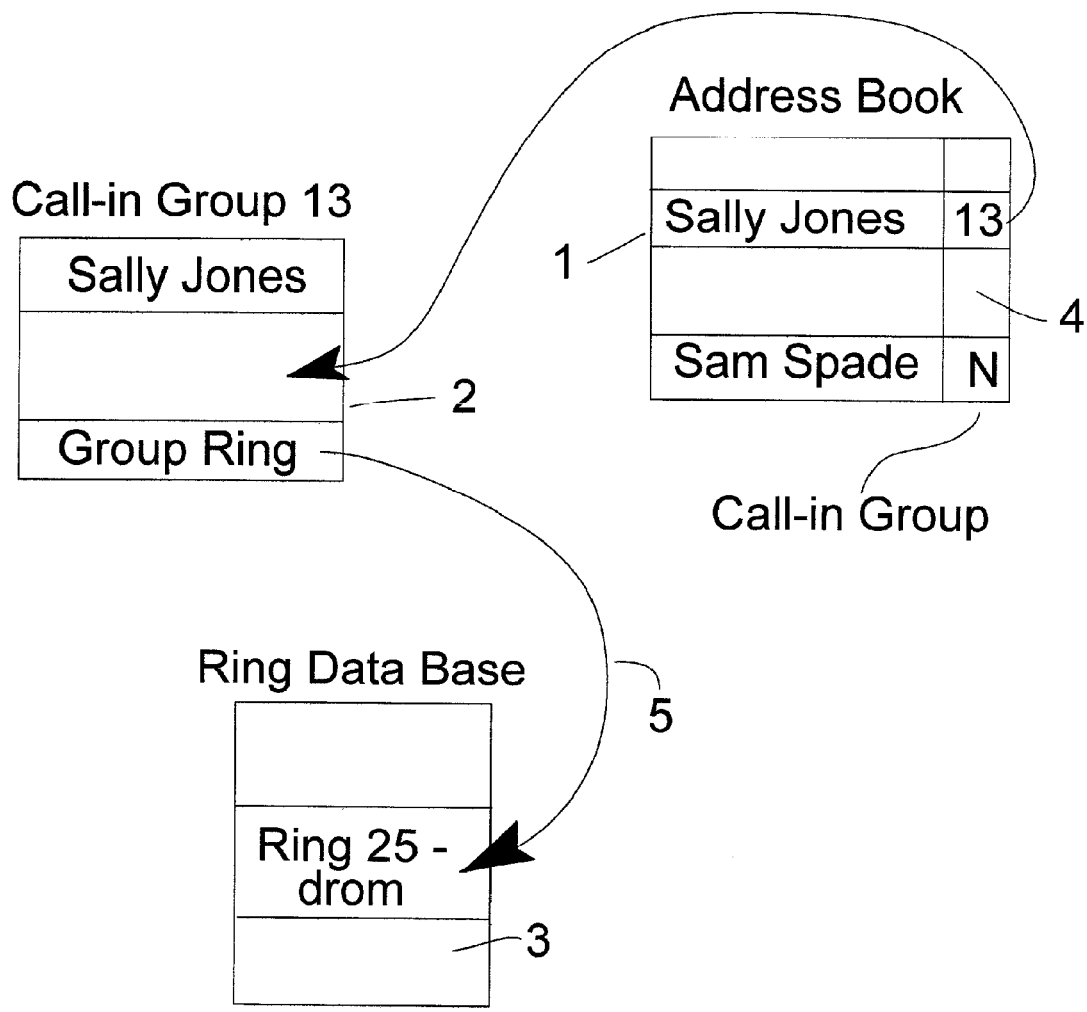
FIG. 2 shows the relationship between an address book and a call-in group entry in a database.

FIG. 2 shows a possible relationship between an address book entry and a call-in group entry in a telephone database. A telephone can contain an address book 1 that contains names of people along with their telephone numbers. A particular field 4 in the address book could be used to point to an entry in a call-in group database or indicate a number of an assigned call-in group. A call-in group database could contain an entry 2 for each call-in group created by the user. This entry 2 could contain a pointer 5 or other indicator of the ring assigned to that call-in group. This could point to or indicate an entry in a ring database 3.

In a particular example of the functioning of the present invention, a user might assign the cellular and home telephone number of his or her spouse to a call-in group, and additionally assign a particular ring to that group. The user might transfer his cellular telephone to an office telephone number that has a PBX supplying voice mail. The user's cellular telephone, using the present invention, could present a short transfer ring belonging assigned to the spouse's call-in group when the transfer is made. In this way, the user would immediately know upon hearing the transfer ring that his spouse had just called and had been transferred to voice mail. This example has been presented to illustrate the functioning of the invention; there are numerous other ways to assign callers to call-in groups.

Several descriptions and illustrations have been presented to aid in the understanding of the present invention. One of skill in the art will realize that numerous changes and variations can be made without departing from the spirit of the invention. Each of these changes and variations is within the scope of the present invention.

I claim:

1. A telephone ring caller identification system comprising: a telephone, said telephone containing a ring generator capable of presenting a plurality of different rings; a address database contained in said telephone including at least one name and number of a particular possible caller; said address database also containing at least an indicator of a first particular ring assigned to said particular possible caller for normal call alerting and an indicator of a second particular ring assigned to said particular possible caller to be used when said particular possible caller is transferred.

2. The telephone ring caller identification system of claim 1 wherein said telephone is a cellular telephone.

3. The telephone ring caller identification system of claim 1 wherein said address database is an address book.

4. The telephone ring caller identification system of claim 1 wherein said address database includes an entry indicating membership in a particular call-in group.

5. The telephone ring caller identification system of claim 4 further comprising a particular call transfer ring being assigned to said call-in group.

6. The telephone ring caller identification system of claim 5 wherein said particular transfer ring is presented if an incoming call comes from a member of said call-in group and said telephone is transferred.

7. The telephone ring caller identification system of claim 1 wherein said telephone presents a default ring when said caller is not present in said address database.

8. The telephone ring caller identification system of claim 1 further comprising a particular voice mail ring assigned to said particular possible caller, wherein said particular voice mail ring is presented when particular possible caller leaves voice mail.

* * * * *